Figure 1:
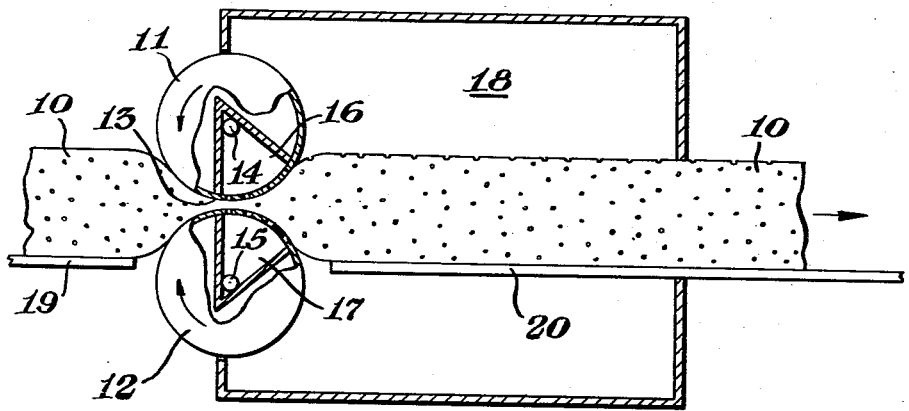

Dec. 3, 1963  B. LEGLER  3,112,524
APPARATUS FOR CURING FOAMED MATERIALS
Filed April 25, 1961

INVENTOR
Bobby Legler

BY [signature]
ATTORNEY

United States Patent Office 3,112,524
Patented Dec. 3, 1963

3,112,524
APPARATUS FOR CURING FOAMED MATERIALS
Bobby Legler, Lake Jackson, Tex., assignor to The Dow Chemical Company, Midland, Mich., a corporation of Delaware
Filed Apr. 25, 1961, Ser. No. 105,309
1 Claim. (Cl. 18—6)

The present invention relates to curing flexible elastomeric cellular materials and is more particularly concerned with a novel apparatus for rapidly curing flexible elastomeric open celled materials, as for example, polyurethane foams.

This application is a continuation in part of application Serial No. 9,935 filed February 19, 1960.

Present day commercial practice usually heat-cures flexible cellular materials for from 2 to 10 or more hours at temperatures from about 70° to 150° C. In those few instances where time and storage area were not critical these cellular materials have been cured at room temperature. This latter method of curing usually requires several days' time and necessarily large areas where the foamed materials can be stored without stacking. It is well known that the cure is an important factor in determining the final physical properties of the materials, e.g., compression set and the like, of the cured cellular materials. Further, in large scale production, rapid cure, reducing the time cycle, or materially reducing the necessity of a large outlay in space, drying ovens, inventory, etc. would be desirable. It is an advantage of the present process that the time for curing the cellular materials is less than approximately one sixtieth of that previously thought necessary to obtain the optimum physical properties, and that the space and equipment to carry out the present process is likewise substantially reduced in size and expense.

It is an object of the present invention to provide an apparatus for rapidly curing flexible elastomeric open celled materials. These and other objects will become apparent to those skilled in the art from the following description of the present invention and the accompanying drawings; in which:

FIGURE 1 shows in partial section in elevation view another embodiment of an apparatus suitable for accomplishing the purpose of the present invention comprising a pair of spaced apart rolls, containing steam sectors for introducing steam into the cells, and heating area.

It has now been found that flexible elastomeric cellular materials having a predominantly open-cell structure can be cured in from 2 seconds to 10 minutes by injecting steam into their interior. The apparatus for accomplishing the introduction of the steam can be accomplished by passing the foamed material between perforated rolls which may have both vacuum sections and steam sections. An apparatus in accordance with the present invention is shown in FIGURE 1.

A cellular elastomeric material 10, for example, a polyurethane foam, is passed between two large perforated rollers 11 and 12 which compress the foam 10 therebetween, crushing any closed cells and expelling the gas from the foam. As the foam passes from between the nip 13 of the rollers 11 and 12, steam from steam pipes 14 and 15 fills steam chests 16 and 17 injecting steam into the foam 10 causing foam 10 to expand as the cells are filled with steam. The expanded foam 10 is then passed through a heated zone or oven 18 to maintain the temperature of the foam at about the steam temperature. That is at a temperature of from about 100° C. to about 150° C. at atmospheric or superatmospheric pressure. The foam is supported before crushing and after crushing by supports 19 and 20. Alternatively, the heated area 18 can be a steam chest in which instance the rollers 11 and 12 need not be perforated or have the steam chests 14 and 15, the steam entering the foam on its expansion in the steam chest 18 as the cells heat and steam fills the voids. The length of time the foam remains in the heated area 18 is dependent upon the temperature of the steam, the thickness of the foam and the degree of cure desired. The residence of the foam within the oven at the steam temperature can be from 2 seconds to 10 minutes. However, for most foams, 10 seconds to about 4 minutes is sufficient.

If the foam is dense, the steam and any condensate which forms can be withdrawn by subjecting the foam to a vacuum, employing several pairs of rollers such as 11 and 12 alternately fitted for steaming chests 16 and 17 and vacuum chests wherein steam lines 14 and 15 are replaced with vacuum lines to evacuate the steamed foam much in the manner and sequence of the introduction of steam and evacuation through rolls as hereinbefore described.

In accordance with the present invention, any flexible elastomeric cellular material requiring heat-curing can be employed. For example, for illustrative purposes only and ease of presentation, a polyurethane foam can be used prepared by first preparing a prepolymer from an active-hydrogen-containing polymeric material of suitable molecular weight and hydroxyl number and a controlled amount of a diisocyanate, permitting the reaction between these materials to continue until substantially all of the exothermic heat of reaction has been generated and dissipated and then adding additional polyisocyanate and water to provide for gas generation. The resulting foam 10 is then passed into an apparatus as shown in FIGURE 1, the foam 10 passing between the rollers 11 and 12 is crushed and any closed cells are opened (ruptured). As the foam passes the nip 13 of the rollers 11 and 12, steam is injected into the interior of the foamed mass to cure the foam. The foam is introduced between the rollers 11 and 12 at such a rate that the introduction of steam is for a period of time of from 2 seconds to about 10 minutes. Introduction of the steam into the foam mass can be made by a single pass through the rollers or by passing the foam through several pairs of rollers to provide a total steam cure of from about 2 seconds to about 10 minutes. Upon completion of the steam injection, the cured foam, if desired, can be subjected to evacuation in a single chest exhaust chamber such as 18 or by passing through a pair of rolls which may have evacuating means associated therewith.

It is to be understood that while polyurethane foams have been described, other foams prepared from other polyfunctional hydroxyl compounds can be cured in like manner with similarly enhanced compression sets, shortened cure periods, etc. Further, other foams which are heat curable can be likewise cured in the same manner.

I claim:

An apparatus for curing cellular elastomeric materials which comprises: perforated opposing compressing rolls provided with a steam chest on the release side positioned within the rolls so as to provide steam for passage through said perforations in said rolls as they pass the nip of the rolls, said rolls being associated with a heated chamber in adjacent relationship to said rolls to maintain the material passing through said rolls at about introduced steam temperature, and support means for said material before and after said compression rolls and throughout and after said heating area.

(References on following page)

References Cited in the file of this patent

UNITED STATES PATENTS

| | | |
|---|---|---|
| 2,350,989 | Craig | June 13, 1944 |
| 2,863,168 | Buckley et al. | Dec. 9, 1958 |
| 2,928,124 | Hugger | Mar. 15, 1960 |
| 2,952,045 | Goodwin et al. | Sept. 13, 1960 |
| 2,990,584 | Goodwin et al. | July 4, 1961 |
| 3,006,033 | Knox | Oct. 31, 1961 |
| 3,012,284 | Touhey | Dec. 12, 1961 |
| 3,056,168 | Terry | Oct. 2, 1962 |

OTHER REFERENCES

Plastics Engineering Handbook, New York, N.Y., Reinhold Pub. Corp. © 1960, 3rd ed., pp. 179–183.